US012120375B2

(12) United States Patent
Yap

(10) Patent No.: US 12,120,375 B2
(45) Date of Patent: Oct. 15, 2024

(54) SYSTEM AND METHOD FOR RESOLVING A SINK DATA AMALGAMATION DURING THE PROGRAMMING OF CONTROLLER DEVICES

(71) Applicant: Home Control Singapore PTE LTD, Singapore (SG)

(72) Inventor: Bin Yang Yap, Singapore (SG)

(73) Assignee: Home Control Singapore PTE LTD, Singapore (SG)

( * ) Notice: Subject to any disclaimer, the term of this patent is extended or adjusted under 35 U.S.C. 154(b) by 0 days.

(21) Appl. No.: 18/294,956

(22) PCT Filed: Jul. 18, 2022

(86) PCT No.: PCT/SG2022/050506
§ 371 (c)(1),
(2) Date: Feb. 2, 2024

(87) PCT Pub. No.: WO2024/019654
PCT Pub. Date: Jan. 25, 2024

(65) Prior Publication Data
US 2024/0276053 A1    Aug. 15, 2024

(51) Int. Cl.
*H04N 21/422* (2011.01)
*H04N 21/436* (2011.01)
*H04N 21/4363* (2011.01)

(52) U.S. Cl.
CPC . *H04N 21/42226* (2013.01); *H04N 21/42221* (2013.01); *H04N 21/43615* (2013.01); *H04N 21/43635* (2013.01)

(58) Field of Classification Search
CPC ....... H04N 21/42226; H04N 21/42221; H04N 21/43615; H04N 21/43635
See application file for complete search history.

(56) References Cited

U.S. PATENT DOCUMENTS

| 9,148,609 B2 * | 9/2015 | Shintani | H04N 21/4436 |
| 9,307,204 B1 | 4/2016 | Garg et al. | |
| 9,756,400 B1 * | 9/2017 | Gildfind | H04N 21/812 |
| 11,244,561 B1 * | 2/2022 | Fuchs | H04W 12/68 |

(Continued)

OTHER PUBLICATIONS

International Search Report and Written Opinion mailed Feb. 22, 2023 for PCT Application No. PCT/SG2022/050506, filed Jul. 18, 2022 in 4 pages.

*Primary Examiner* — Oschta I Montoya
(74) *Attorney, Agent, or Firm* — Knobbe, Martens, Olson & Bear, LLP

(57) ABSTRACT

A controller device programming system and method directed at identifying a connected display device 30 connected to a content management device 20 via at least one connected intermediary device 40. The system and method evaluate the details included within a sink data amalgamation that includes sink identification data from both the connected display device 30 and at least one of the connected intermediary devices 40. Keywords, whitelists, and blacklists can be employed to evaluate the content of the sink data amalgamation and determine one or more priority display device matches to, in turn, improve selection of a set of function codes for control of the connected display device 30 using a controller device 50 paired with the content management device 20.

19 Claims, 9 Drawing Sheets

(56) References Cited

U.S. PATENT DOCUMENTS

| | | | |
|---|---|---|---|
| 2003/0071117 A1* | 4/2003 | Meade, II | H04N 21/42204 |
| | | | 348/E5.103 |
| 2009/0161027 A1* | 6/2009 | Hardacker | H04N 21/472 |
| | | | 725/38 |
| 2009/0281643 A1 | 11/2009 | Higuchi et al. | |
| 2012/0075082 A1* | 3/2012 | Rothkopf | G08C 19/28 |
| | | | 348/E5.09 |
| 2017/0034563 A1 | 2/2017 | Fischer et al. | |
| 2022/0232270 A1* | 7/2022 | Arling | H04N 21/8186 |

* cited by examiner

E-EDID STRUCTURE 2-00

| Address | Bytes | Description | Format |
|---|---|---|---|
| 00h | 8 | Header = (00 FF FF FF FF FF FF 00)h | See Section 3.3 |
| 08h | 10 | Vendor & Product Identification: | See Section 3.4 |
| 08h | 2 | ID Manufacturer Name * | ISA 3-character ID Code |
| 0Ah | 2 | ID Product Code * | Vendor assigned code |
| 0Ch | 4 | ID Serial Number * | 32-bit serial number |
| 10h | 1 | Week of Manufacture | Week number or Model Year Flag |
| 11h | 1 | Year of Manufacture or Model Year | Manufacture Year or Model Year |
| 36h | 18 | Preferred Timing Mode | |
| 48h | 18 | Detailed Timing # 2 or Display Descriptor* | |
| 5Ah | 18 | Detailed Timing # 3 or Display Descriptor | |
| 6Ch | 18 | Detailed Timing # 4 or Display Descriptor | |

FROM VESA E-EDID STANDARD v1.4 TABLE 3.1 (TRUNCATED)

PRIOR ART    FIG. 2

DISPLAY DESCRIPTOR SUMMARY

⌐ 3A-00

| Byte # | # of Bytes | Values | Display Descriptor Definitions |
|---|---|---|---|
| 0, 1 | 2 | 00 00h | Indicates that this 18 byte descriptor is a Display Descriptor |
| 2 | 1 | 00h | Reserved: Set to 00h when 18 byte descriptor is used as a Display Descriptor |
| | | Tag | Display Descriptor Tag Numbers |
| | | FFh | Display Product Serial Number: *     Defined in Section 3.10.3.1 |
| | | FEh | Alphanumeric Data String (ASCII):   *     Defined in Section 3.10.3.2 |
| 3 | 1 | FDh | Display Range Limits: Includes optional timing information — GTF using default parameters, GTF Secondary Curve or CVT Descriptor. Defined in Section 3.10.3.3 |
| | | FCh | Display Product Name: *     Defined in Section 3.10.3.4 |
| | | FBh | Color Point Data     Defined in Section 3.10.3.5 |
| | | FAh | Standard Timing Identifications     Defined in Section 3.10.3.6 |
| | | F9h | Display Color Management (DCM) Data:     Defined in Section 3.10.3.7 |
| | | F8h | CVT 3 Byte Timing Codes     Defined in Section 3.10.3.8 |
| | | F7h | Established Timings III     Defined in Section 3.10.3.9 |
| | | 11h — F6h | Reserved: Currently undefined — Do Not Use     Refer to Section 3.10.3.10 |
| | | 10h | Dummy Descriptor     Defined in Section 3.10.3.11 |
| | | 00h — 0Fh | Manufacturer Specified Display Descriptors     Defined in Section 3.10.3.12 |
| 4 | 1 | 00h | Reserved: Set to 00h when 18 byte descriptor is used as a Display Descriptor Exception: Refer to Display Range Limits Descriptor (Tag FDh) — Section 3.10.3.3 |
| 5 → 17 | 13 | 00h — FFh | Stored data dependant on Display Descriptor Definition |

PRIOR ART     FIG. 3A     FROM VESA E-EDID STANDARD v1.4 TABLE 3.23

DISPLAY PRODUCT SERIAL NUMBER, ALPHANUMERIC DATA STRING, NAME DEFINITION

Display Product Serial Number Definition

| Byte # | Value | |
|---|---|---|
| 0, 1 | (00 00)h | Indicates that this 18 byte descriptor is a Display Descriptor |
| 2 | 00h | Reserved: Set to 00h when 18 byte descriptor is used as a Display Descriptor |
| 3 | FFh | Display Product Serial Number Descriptor Tag Number |
| 4 | 00h | Reserved |
| 5 → 17 | 00h → FFh | Up to 13 alphanumeric characters of a serial number may be stored. |

3B-01

Alphanumeric Data String Definition

| Byte # | Value | |
|---|---|---|
| 0, 1 | (00 00)h | Indicates that this 18 byte descriptor is a Display Descriptor |
| 2 | 00h | Reserved: Set to 00h when 18 byte descriptor is used as a Display Descriptor |
| 3 | FEh | Alphanumeric Data String Descriptor Tag Number |
| 4 | 00h | Reserved |
| 5 → 17 | 00h → FFh | Up to 13 alphanumeric characters of a data string may be stored |

3B-02

Display Product Name Definition

| Byte # | Value | |
|---|---|---|
| 0 → 4 | (0) 00 00 FC 00h | Display Product Name (ASCII String Descriptor Tag Number (FCh) |
| 5 → 17 | ASCII String | Up 13 alphanumeric characters (using ASCII Codes) of a data string may be stored. |

3B-03

PRIOR ART  FIG. 3B  FROM VESA E-EDID STANDARD v1.4 TABLES 3.24, 3.25, 3.29

FIRST E-EDID EXTENSION WITH CEA EXTENSION -- SOURCE PHYSICAL ADDRESS  4A-00

| BYTE# | 7 | 6 | 5 | 4 | 3 | 2 | 1 | 0 |
|---|---|---|---|---|---|---|---|---|
| 4 | | A | | | | B | | |
| 5 | | C | | | | D | | |

FROM HDMI SPECIFICATION v1.3a TABLE 8-6 (TRUNCATED)

FIG. 4A

PRIOR ART

SYSTEM AND METHOD FOR RESOLVING A SINK DATA AMALGAMATION DURING THE PROGRAMMING OF CONTROLLER DEVICES

TECHNICAL CONTRIBUTION

The present disclosure relates to controller device programming. More particularly, the present disclosure relates to a system and method for resolving a sink data amalgamation during the programming of controller devices.

BACKGROUND

Programmable controller devices are often referred to as universal controller devices, as these controller devices are designed to work with a wide variety of devices (rather than just a single device model).

In recent years, set top boxes are paired and/or delivered with controller devices that can control both the set top box and the television connected to the set top box. To assist the programming of the controller devices, the set top boxes can seek to determine the manufacturing name and/or display product name of the television connected to the set top box, then use that identification data to determine the proper set of function codes that can be loaded on the controller device to control the television. Such efforts are impacted by any inaccuracies in the identification data received by the set top box.

The common published standards for communication protocols between set top boxes and televisions include the HDMI specification, the VESA E-EDID standard, and the CEA standard. This Application references tables and other details from the following documentation: (1) references to the HDMI specification are to the "High-Definition Multimedia Interface Specification", version 1.3a, published by HDMI Licensing LLC, dated 10 Nov. 2006; (2) references to the VESA E-EDID standard are to the "VESA Enhanced Extended Display Identification Data Standard", structure version 1, revision 4, release A, revision 2, published by the Video Electronics Standards Association, dated 25 Sep. 2006; and (3) references to the CEA standard are to the "CEA Standard. A DTV Profile for Uncompressed High Speed Digital Interfaces", version CEA-861-D, published by the Consumer Electronics Association, dated July 2006.

Common acronyms used in the background documentation and related art include:
ASCII American Standard Code for Information Interchange
AV audio/video
BLE Bluetooth Low Energy
CD controller device
CEA Consumer Electronics Association
CEC Consumer Electronics Control
DDC display data channel
DTV digital television
DVD digital versatile disc
D-VHS digital video home system (VHS)
DVI digital visual interface
E-EDID enhanced extended display identification data
EDID extended display identification data
HDMI high-definition multimedia interface
IEEE Institute of Electrical and Electronics Engineers
IR infrared
ISA Industry Standard Architecture
PNPID Plug and Play Device Identifier
PROM programmable read-only memory
PVR personal video recorder
RF radio frequency
ROM read-only memory
STB set-top box
TMDS transition minimized differential signaling
VESA Video Electronics Standards Association FIG. 1 is a block diagram detailing the wired communication between an HDMI source 11 and an HDMI sink 12 in the prior art for the HDMI communication protocol. This block diagram is taken from FIG. 3-1 of the HDMI specification. As an overview, HDMI system architecture is defined to consist of HDMI sources 11 and HDMI sinks 12. A given device may have one or more HDMI inputs and one or more HDMI outputs. To comply with the HDMI specification, each HDMI input on these devices must follow all of the rules for an HDMI sink 12. Likewise, each HDMI output must follow all of the rules for an HDMI source 11. An HDMI cable 23C (see FIG. 5) between the HDMI source 11 and the HDMI sink 12 transmits transition minimized differential signaling (TMDS) channels 14, a display data channel (DDC) 15, and a Consumer Electronics Control (CEC) line 16. As shown in FIG. 1, enhanced extended display identification data (E-EDID) can be stored in an ROM 13, though this memory can also be a programmable read-only memory or a dynamic random access memory. The HDMI source 11 includes an HDMI transmitter and the HDMI sink 12 includes an HDMI receiver.

FIG. 2 is a truncated chart 2-00 from table 3.1 of the VESA E-EDID standard detailing the E-EDID structure in the prior art. All sinks must contain a CEA-861-D compliant E-EDID structure accessible through the DDC 15. An HDMI source 11 reads the E-EDID and a first CEA Extension to determine the capabilities supported by the HDMI sink 12. Additional extensions may be read to discover additional capabilities. The HDMI source 11 is responsible for any format conversions that may be necessary to supply audio and video in an understandable form to the HDMI sink 12. The overall structure of the E-EDID for the HDMI sink 12 must conform to the E-EDID structure defined in the VESA E-EDID standard. The first 128 bytes of the E-EDID contain an E-EDID structure that also meets the requirements of the CEA standard. The first E-EDID extension must contain a CEA extension, defined in the CEA standard, including a 2-byte source physical address field (see FIGS. 4A and 4B for detailed discussion).

For the purposes of this Application, asterisks are added to the chart 2-00 of FIG. 2 to emphasize the fields of primary importance for the invention, namely the ID manufacturer name, the ID product code, the ID serial number, and the display descriptor (see below FIGS. 3A and 3B). The ID manufacturer name field is a required element in E-EDID structure. The ID manufacturer name field contains a 2-byte representation of the device manufacturer's ISA 3-character 1D code. These codes are also called the ISA (Industry Standard Architecture) Plug and Play Device Identifier (PN-PID) issued by Microsoft Corporation. The ID product code field is a required element in E-EDID structure. The ID product code field contains a 2-byte manufacturer assigned product code; the ID product code is used to differentiate between different models from the same manufacturer, for example with a model number. The ID serial number is a 32-bit serial number used to differentiate between individual instances of the same display model, its use is optional. The display descriptor is detailed in FIGS. 3A and 3B below.

As discussed below in this Application, the ID manufacturer name is a field of great importance for the invention (along with the display product name listed in chart 3A-00 of FIG. 3A, discussed below). Per the VESA E-EDID standard section 3.10.3.4, it is recommended that the display product name include the model name. As used in this specification, the term "display product name" therefore can include the model name, but is not limited to the model name.

FIG. 3A is a chart 3A-00 from table 3.23 of the VESA E-EDID standard detailing the display descriptor summary in the prior art. For the purposes of this Application, asterisks are added to the chart 3A-00 to emphasize the fields of primary importance for the invention, namely the display product serial number, the alphanumeric data string (ASCII), and the display product name.

The charts of FIG. 3B provide additional details regarding these asterisked fields, with chart 3B-01 providing details of the display product serial number definition, chart 3B-02 providing details of the alphanumeric data string definition, and chart 3B-03 providing details of the display product name definition in the prior art. Charts 3B-01, 3B-02, and 3B-03 are taken from the VESA E-EDID standard tables 3.24, 3.25, and 3.29, respectively. As discussed below in this Application, the display product name is a field of great importance for the invention (along with the ID manufacturer name listed in the chart 2-00 of FIG. 2, see above).

FIG. 4A is a truncated chart 4A-00 detailing the first E-EDID extension with CEA extension for the source physical address from the HDMI specification, from the HDMI specification table 8-6 in the prior art. The first E-EDID extension includes a 2-byte source physical address field. The source physical address is received by the HDMI source 11 in wired communication with the HDMI sink 12, as illustrated in the cluster 60 of FIG. 4B, as part of the E-EDID extension. The cluster 60 illustrated in FIG. 4B is adapted from FIG. 8-3 of the HDMI specification in the prior art.

The CEC line 16 is directly connected to all devices of the cluster 60. After discovering their own physical address, each device transmits its physical and logical addresses to all other devices, thus allowing any device in the cluster 60 to create a map of the cluster 60. The physical address of each device is determined through the physical address discovery process. This process is dynamic in that it automatically adjusts physical addresses as required as devices are physically or electrically added or removed from the cluster 60. All physical addresses are 4 digits long allowing for a 5-device-deep hierarchy, in the form of n.n.n.n in the following description. A HDMI sink 12 or a repeater that is acting as the CEC root device will generate its own physical address: 0.0.0.0. An HDMI source 11 or a repeater reads its physical address from the E-EDID of the connected HDMI sink 12 to which it s connected. Each HDMI sink 12 (or repeater) is responsible for generating the physical address of all HDMI sources 11 connected to that HDMI sink 12 (or repeater) by appending a port number onto its own physical address and placing that value in the E-EDID for the port for reading by the connected HDMI source 11. As discussed above in relation to chart 4A-00 of FIG. 4A, the source physical address field of the HDMI specification includes the 4 digit source physical address read by the HDMI source 11.

As background for the invention, the devices of key importance in FIG. 4B are the connected display device (CDD) 30, the connected intermediary device (CID) 40, and the content management device (CMD) 20. In this cluster 60, the connected display device 30 is the CEC root device and has a physical address of 0.0.0.0. The exploded view (see bottom right of FIG. 4B) of the connected display device (CDD) 30 illustrates two E-EDIDs, one for each input to this CEC root device, with the top E-EDID including a source physical address of 1.0.0.0 and the bottom E-EDID including a source physical address of 2.0.0.0. The connected intermediary device, when reading the E-EDID of the connected display device 30, receives its physical address 2.0.0.0. In turn, the content management device 20 receives its physical address 2.3.0.0 from the E-EDID of the connected intermediary device 40. Note that the n.n.n.n values shown in each device of the cluster 60 in FIG. 4B represent the physical address for the devices themselves, not the source physical addresses stored in the E-EDID within that device. Thus, as enabled by the HDMI specification and VESA E-EDID standard, a content management device 20 can discover the presence of a connected intermediary device 40 located between the content management device 20 and a connected display device 30. As illustrated, the cluster 60 of FIG. 4B also includes a DVD with physical address 2.1.0.0, a D-VHS with physical address 2.2.0.0, and a PVR with physical address 2.3.1.0.

FIG. 5 is a block diagram illustrating the HDMI connection between a content management device 20 and a connected display device 30 in the prior art. In this block diagram, there is no connected intermediary device 40 located between the content management device 20 and the connected display device 30. An HDMI cable 23C connects the CMD audio/visual output 23A with the CDD audio/visual input 23B to enable the HDMI communication protocol. The connected display device 30 includes a CDD radio frequency (RF) transceiver 24B and a CDD infrared receiver 25B. The content management device 20 of FIG. 5 further includes a CMD audio/visual input 21A (depicted as a coaxial input 21A in FIG. 5), an ethernet input 22, a CMD radio frequency (RF) transceiver 24A, a CMD infrared receiver 25A, and a power input 26A. The CMD audio/visual input 21A is in data communication with a coaxial cable outlet 21C via a coaxial cable 21B. The power input 26A is electrically connected to a power output 26C via a power cable 26B. The connected display device 30 includes a CDD radio frequency (RF) transceiver 24B and a CDD infrared receiver 25B. The CDD RF transceiver 24O and the CMD RF transceiver 24A are illustrated as Bluetooth Low Energy (BLE) transceivers, but could be any type of radio frequency (RF) transceiver. E.g., a BLE transceiver is a type of RF transceiver. Bluetooth is a registered trademark of The Bluetooth Special Interest Group (SIG).

Note that while FIG. 5 illustrates a system with a single connected intermediary device 40, a hierarchy of two or more connected intermediary devices 40 could also be connected in series between the content management device 20 and the connected display device 30.

As will be evident later in this Applications's detailed description of the invention, the addition of a connected intermediary device 40 between a content management device 20 and a connected display device 30 increases the difficulty of accurately identifying the make and model of the connected display device 30. One reason for this difficulty is evident within the glossary of terms and the Appendix A of the HDMI specification. The glossary of terms section 2.2 of the HDMI specification defines: (a) an HDMI source 11 as a device with an HDMI output. (b) an HDMI sink 12 as a device with an HDMI input; and (c) an HDMI repeater as a device with one or more HDMI inputs and one or more HDMI outputs. Hence, a repeater simultaneously behaves as both an HDMI sink 12 and an HDMI source 11. Appendix A of the HDMI specification states that the E-EDID presented by a repeater should reflect the "capabilities" of the downstream HDMI sink 12 and that, in terms of E-EDID handling, repeaters typically fall into one of two categories: (a) a "stored E-EDID type" of repeater, where the repeater stores an E-EDID structure that typically consists of downstream HDMI sink 12 capabilities; and (b) a "forwarding E-EDID type" of repeater, where the repeater does not store an E-EDID structure, but rather when an E-EDID read request comes from an HDMI source 11, the repeater forwards the read request to an HDMI sink 12, and then the E-EDID data from the HDMI sink 12 is forwarded back to the HDMI source 11 in an unaltered form by the repeater.

Hence, the HDMI specification introduces the potential for a connected intermediary device 40, in its role as a repeater, to treat the E-EDID data in different fashions when communicating with the content management device 20, alternatively communicating interpreted "capabilities" or an exact forwarded E-EDID. If communicating "capabilities", the connected intermediary device 40 can alter the E-EDID of the connected display device 30, then pass through the interpreted "capabilities" of the connected display device 30 within the fields of the E-EDID sent to the content management device 20. If communicating an exact forwarded E-EDID, the connected intermediary device 40 can merely pass through the E-EDID of the connected display device 30 in a "forwarding E-EDID type" transfer without alteration.

The differences between interpreted "capabilities" and an exact forwarded E-EDID impact the ability of the content management device 20, such as a set top box paired with a controller device 50, to accurately identify the connected display device 30 when connected via a connected intermediary device 40 (acting as a repeater). For instance, the content management device 20 may receive an E-EDID from the connected intermediary device 40 that is a sink data amalgamation which includes some fields from the E-EDID of the connected display device 30 and other fields from the E-EDID of the connected intermediary device 40. As an example, the sink data amalgamation received by a set top box may include the ID manufacturer name of an audio device that is connected between the set top box and a television along with the display product name (which, as discussed above, can be or include the model name) of the television. Such an amalgamated or scrambled E-EDID makes it challenging for the set top box and a controller device 50 to correctly identify the applicable set of function codes for control of the television using the controller device 50.

An audio device may intentionally insert its own audio capabilities into the E-EDID so that the set top box transmits audio in a format best suited for the audio device (especially when the audio format used by the audio device is not supported by the connected display device 30). As an example, per section 3 of the HDMI specification, basic audio functionality consists of a single IEC 60958 L-PCM audio stream at sample rates of 32 kHz, 44.1 kHz or 48 kHz. This can accommodate any normal stereo stream. Optionally, HDMI can carry such audio at sample rates up to 192 KHz and with 3 to 8 audio channels. HDMI can also carry an IEC 61937 compressed (e.g., surround-sound) audio stream at bit rates up to 24.576 Mbps. HDMI can also carry from 2 to 8 channels of One Bit Audio and a compressed form of One Bit Audio called DST. Hence, if the content management device 20 and the audio device both support surround-sound, the audio device can provide surround-sound to a user if the content management device 20 deliveries the audio to the audio device in the surround-sound audio format. Delivery of such audio format via the HDMI communication protocol is designated by the data in the fields of the E-EDID. Note also that the glossary of terms section 2.2 of the HDMI specification details that a CEA extension block can be used to allow declaration of audio formats beyond those defined in the base E-EDID structure of the H DMI sink 12.

During the design of a repeater, reliability of the data within the fields of the E-EDID is likely to be a lower priority. For instance, when designing firmware for an audio device that acts as a repeater for a specific television, an audio device manufacturer can (arguably within the guidance of the HDMI specification) intentionally alter the data within the fields of the E-EDID of the specific television to instead identify a different television that has the requisite audio capabilities preferred by the audio device. In this manner, the audio device manufacturer prioritizes details within the fields of the E-EDID that best showcase the audio capabilities of the company's product. Similarly, repeaters used for HDMI switching and HDMI emulation can be designed intentionally to swap out or otherwise alter data within the fields of the E-EDID. Such editing of the data within the fields of the E-EDID results in a sink data amalgamation (or scrambling of the E-EDID) impacting the ability of a set top box to properly identify the specific television's make and model. Improper identification of the specific television, in turn, can result in an incorrect identification of the set of function codes to be uploaded to the controller device 50 for user control of the specific television.

When a controller device 50 does not properly control a television, a user may likely blame the controller device's 50 manufacturer, as the failure occurs during use of the controller device 50. To maintain a positive business reputation and also reduce customer support inquiries, it is valuable to eliminate the impact of any sink data amalgamation. What is needed therefore is a system for evaluation each E-EDID received by set top box to determine if the fields of the E-EDID are a sink data amalgamation and, if so, nevertheless determine a priority display device match for the television. This priority display device match for the television then can, in turn, be employed to properly identify and upload to the controller device 50 a set of function codes operable with the television.

SUMMARY OF INVENTION

A general embodiment of the invention is a controller device programming system and method directed at identifying a connected display device connected to a content management device via at least one connected intermediary device. The system and method evaluate the details included within a sink data amalgamation that includes sink identification data from both the connected display device and at least one of the connected intermediary devices. Keywords, whitelists, and blacklists can be employed to evaluate the content of the sink data amalgamation and determine one or more priority display device matches to, in turn, improve selection of a set of function codes for control of the connected display device using a controller device paired with the content management device.

A primary embodiment of the invention is a controller device programming system for performing at least one programming request for a controller device (CD), the controller device paired with a content management device (CMD) in indirect data communication with a connected display device (CDD) via at least one connected intermediary device (CID). The controller device includes: (i) an CD radio frequency (RF) transceiver; (ii) an CD memory; and (iii) a codeset test module. The content management device includes: (1) a CMD audio/visual input configured to receive first audio/visual content according to a first communication protocol; (2) a CMD audio/visual output configured to send second audio/visual content directly or indirectly to the at least one connected intermediary device according to a second communication protocol; (3) a CMD RF transceiver configured for wireless communication with the controller device according to a third communication protocol; and (4) a discovery module, an inspection module, and an CD programmer. The content management device stores or links to: (1) a codeset database with a plurality of codeset records; and (2) a sink database with a plurality of sink records. Each codeset record includes or links to: (i) at least one codeset identifier of a plurality of codeset identifiers; and (ii) a set of function codes associated with the at least one codeset identifier of the codeset record. Each sink record includes or links to: (i) at least one sink identifier of a plurality of sink identifiers, each sink identifier associated with at least one of a plurality of sink devices: (ii) at least one of the codeset identifiers, the at least one codeset identifier designating the set of function codes for the at least one sink device associated with the sink record; and (iii) a keyword set for the at least one sink device associated with the sink record. The keyword set of each sink record includes at least one of: (1) manufacturer name of the at least one sink device associated with the sink record; (2) device name of the at least one sink device associated with the sink record; and (3) serial number of the at least one sink device associated with the sink record. Each of the at least one connected intermediary devices includes: (i) a CID audio/visual input configured to receive the second audio/visual content directly or indirectly from the content management device according to the second communication protocol; and (ii) a CID audio/visual output configured to send third audio/visual content from the connected intermediary device directly or indirectly to the connected display device according to the second communication protocol. The connected display device includes: (i) a CDD audio/visual input configured to receive the third audio/visual content from the content management device according to the second communication protocol: and (ii) at least one of a CDD RF transceiver and a CDD infrared receiver.

As used in this specification, the term "device name" is intended to include any of the following: (i) the display product name of a device, as identified under the VESA E-EDID standard; (ii) a model name as included within the display product name of a device VESA E-EDID standard; and (iii) a name of common usage given to a device by the marketer or manufacturer of a device. The terms "device" and "device name" are not limited to display products. E.g., devices can include products other than connected display devices.

In the primary embodiment of the invention, for each programming request, the discovery module of the content management device is configured to: (1) receive physical address data for a cluster including the connected display device, the at least one connected intermediary device, and the content management device; (2) confirm presence of indirect data communication between the content management device and the connected display device based on the physical address data; and (3) request and receive sink identification data via the second communication protocol. For each programming request, the sink identification data: (1) is organized according to a device identification data structure; and (2) comprises a sink data amalgamation. The sink data amalgamation comprises at least two of: (a) the manufacturer name of at least one of the connected intermediary devices; (b) the manufacturer name of the connected display device; (c) the device name of at least one of the connected intermediary devices: (d) the device name of the connected display device; (c) the serial number of at least one of the connected intermediary devices; and (I) the serial number of the connected display device. For each programming request, the inspection module of the content management device is configured to: (i) access the sink identification data received by the discovery module; (ii) access the sink records of the sink database; (iii) perform a keyword search of the keyword sets of the sink records of the sink database employing at least a portion of the sink identification data; (iv) identify at least one priority display device match; and (v) cross-reference each priority display device match to at least one codeset identifier in the sink records of the sink database. A priority of each priority display device match is calculated according to at least one of: (1) a first reliability score for the manufacturer name; (2) a second reliability score for the device name: and (3) a third reliability score for the serial number. For each programming request, the CD programmer is configured to: (i) access the codeset database; (ii) initialize communication with the controller device via the third communication protocol; and (iii) for each codeset identifier cross-referenced to at least one priority display device match by the inspection module, transfer at least a portion of the set of function codes associated with the codeset identifier to the controller device via the third communication protocol. For each programming request, the controller device is configured to: (i) test functionality of at least a subset of each set of function codes received by the controller device from the CD programmer of the content management device to identify at least one functional codeset: (ii) store at least one functional codeset within the CD memory of the controller device; and (iii) employ the at least one functional codeset, based on user input, to control operation of the connected display device.

In an alternative embodiment of the invention, the sink records of the sink database are categorized into at least one of: (i) a manufacturer name whitelist associated a plurality of confirmed display manufacturers; and (ii) a manufacturer name blacklist associated with at least one of a plurality of audio device manufacturers, a plurality of non-display device manufacturers, and a plurality of repeater device manufacturers. For each programming request, the inspection module: (i) locates the manufacturer name identified by the sink identification data, as mapped by the device identification data structure: and (ii) searches the sink database for the identified manufacturer name. For each programming request, the inspection module can also optionally: (i) increase a reliability score of the manufacturer name of the programming request if the manufacturer name included in the sink identification data of the programming request is included within the manufacturer name whitelist; and (ii) decrease the reliability score of the manufacturer name of the programming request if the manufacturer name included in the sink identification data of the programming request is included within the manufacturer name blacklist.

In an alternative embodiment of the invention, the sink records of the sink database are categorized into at least one of: (i) a device name whitelist associated with a plurality of confirmed display device names; and (ii) a device name blacklist associated with at least one of a plurality of audio device names, a plurality of non-display device names, and a plurality of repeater device names. For each programming request, the inspection module: i) locates the device name identified by the sink identification data, as mapped by the device identification data structure; and (ii) searches the sink database for the identified device name. For each programming request, the inspection module can also optionally: (i) if the device name of the programming request is included within the device name whitelist, increase a reliability score of the device name of the programming request; and (ii) if the device name of the programming request is included within the device name blacklist, decrease the reliability score of the device name of the programming request.

In an alternative embodiment of the invention, the device identification data structure is an enhanced extended display identification data (E-EDID) structure including: (a) a set of vendor and product identification fields; and (b) a set of display descriptor fields. The set of vendor and product identification fields include at least one of: (i) an ID manufacturer name; (ii) an ID product code; (iii) an ID serial number. (iv) a week of manufacture; and (v) a year of manufacture. The set of display descriptor fields include at least one of: (i) a display product serial number: (ii) an alphanumeric data string in ASCII format: and (iii) a display product name. In this alternative embodiment of the invention, the sink data amalgamation can include: (a) the ID manufacturer name of at least one of the connected intermediary devices; and (b) the display product name of the connected display device. In this alternative embodiment of the invention, the keyword set of each sink record: (a) can be assembled from at least one of a datasheet specification of the at least one sink device associated with the sink record and from empirical Information within the fields of the E-EDID received via the second communication protocol from at least one sink device associated with the sink record; and (b) can include at least one of the ID manufacturer name of the at least one sink device associated with the sink record, the ID product code of the at least one sink device associated with the sink record, the ID serial number of the at least one sink device associated with the sink record, the week of manufacture of the at least one sink device associated with the sink record, the year of manufacture of the at least one sink device associated with the sink record, the display product serial number of the at least one sink device associated with the sink record, the alphanumeric data string in ASCII format of the at least one sink device associated with the sink record, and the display product name of the at least one sink device associated with the sink record, a device type of the at least one sink device associated with the sink record, a brand identifier of the at least one sink device associated with the sink record; and a keyword of the at least one sink device associated with the sink record. In this alternative embodiment of the invention, for the calculation of the priority of each priority display device match by the inspection module: (a) the manufacturer name can be the ID manufacturer name within the sink identification data, as mapped by the E-EDID structure; (b) the device name can be the ID display product name within the sink identification data, as mapped by the E-EDID structure; and (c) the serial number can be the ID serial number within the sink identification data, as mapped by the E-EDID structure.

In an alternative embodiment of the invention, the content management device further includes: (i) an ethernet connection connectable to an offsite server via a network; and (ii) an update module. The offsite server includes: (i) a current sink database; and (ii) a current codeset database. The update module of the content management device is configured to perform at least one of: (i) downloading from the offsite server and storing within the content management device at least a portion of the current sink database and at least a portion of the current codeset database; and (ii) linking to the current sink database and linking to the current codeset database.

A secondary embodiment of the invention is a controller device programming method for performing at least one programming request for a controller device (CD), the controller device paired with a content management device (CMD) in indirect data communication with a connected display device (CDD) via at least one connected intermediary device (CID). The controller device includes: (i) an CD radio frequency (RF) transceiver; (ii) an CD memory; and (iii) a codeset test module. The content management device includes: (1) a CMD audio/visual input configured to receive first audio/visual content according to a first communication protocol: (2) a CMD audio/visual output configured to send second audio/visual content directly or indirectly to the at least one connected intermediary device according to a second communication protocol; (3) a CMD RF transceiver configured for wireless communication with the controller device according to a third communication protocol: and (4) a discovery module, an inspection module, and an CD programmer. The content management device stores or links to: (1) a codeset database with a plurality of codeset records: and (2) a sink database with a plurality of sink records. Each codeset record includes or links to: (i) at least one codeset identifier of a plurality of codeset identifiers; and (ii) a set of function codes associated with the at least one codeset identifier of the codeset record. Each sink record includes or links to: (i) at least one sink identifier of a plurality of sink identifiers, each sink identifier associated with at least one of a plurality of sink devices: (ii) at least one of the codeset identifiers, the at least one codeset identifier designating the set of function codes for the at least one sink device associated with the sink record; and (iii) a keyword set for the at least one sink device associated with the sink record. The keyword set of each sink record includes at least one of: (1) manufacturer name of the at least one sink device associated with the sink record; (2) device name of the at least one sink device associated with the sink record; and (3) serial number of the at least one sink device associated with the sink record. Each of the at least one connected intermediary devices includes: (i) a CID audio/visual input configured to receive the second audio/visual content directly or indirectly from the content management device according to the second communication protocol; and (ii) a CID audio/visual output configured to send third audio/visual content from the connected intermediary device directly or indirectly to the connected display device according to the second communication protocol. The connected display device includes: (i) a CDD audio/visual input configured to receive the third audio/visual content from the content management device according to the second communication protocol: and (ii) at least one of a CDD RF transceiver and a CDD infrared receiver.

In the secondary embodiment of the invention, for each programming request, the discovery module of the content management device performs the steps of: (1) receiving physical address data for a cluster including the connected display device, the at least one connected intermediary device, and the content management device; (2) confirming presence of indirect data communication between the content management device and the connected display device based on the physical address data; and (3) requesting and receiving sink identification data via the second communication protocol. For each programming request, the sink identification data: (1) is organized according to a device identification data structure; and (2) comprises a sink data amalgamation. The sink data amalgamation comprises at least two of: (a) the manufacturer name of at least one of the connected intermediary devices; (b) the manufacturer name of the connected display device; (c) the device name of at least one of the connected intermediary devices: (d) the device name of the connected display device; (e) the serial number of at least one of the connected intermediary devices; and (f) the serial number of the connected display device. For each programming request, the inspection module of the content management device performs the steps of: (i) accessing the sink identification data received by the discovery module; (ii) accessing the sink records of the sink database; (iii) performing a keyword search of the keyword sets of the sink records of the sink database employing at least a portion of the sink identification data; (iv) identifying at least one priority display device match; and (v) cross-referencing each priority display device match to at least one codeset identifier in the sink records of the sink database. A priority of each priority display device match is calculated according to at least one of: (1) a first reliability score for the manufacturer name; (2) a second reliability score for the device name; and (3) a third reliability score for the serial number. For each programming request, the CD programmer performs the steps of: (i) accessing the codeset database; (ii) initializing communication with the controller device via the third communication protocol; and (iii) for each codeset identifier cross-referenced to at least one priority display device match by the inspection module, transferring at least a portion of the set of function codes associated with the codeset identifier to the controller device via the third communication protocol. For each programming request, the controller device performs the steps of: (i) testing functionality of at least a subset of each set of function codes received by the controller device from the CD programmer of the content management device to identify at least one functional codeset; (ii) storing at least one functional codeset within the CD memory of the controller device; and (iii) employing the at least one functional codeset, based on user input, to control operation of the connected display device.

BRIEF DESCRIPTION OF THE DRAWINGS

Embodiments of the present disclosure are described herein with reference to the drawings in which:

FIG. 2 is a truncated chart detailing the E-EDID structure from the VESA E-EDID standard, as detailed in the prior art.

FIG. 3A is a chart detailing the display descriptor summary from the VESA E-EDID standard, as detailed in the prior art.

FIG. 3B provides additional details of display descriptor summary fields from the VESA E-EDID standard, as detailed in the prior art.

FIG. 4A is a truncated chart detailing the first E-EDID extension with CEA extension for the source physical address from the HDMI specification, as detailed in the prior art.

DETAILED DESCRIPTION

Figure 1:
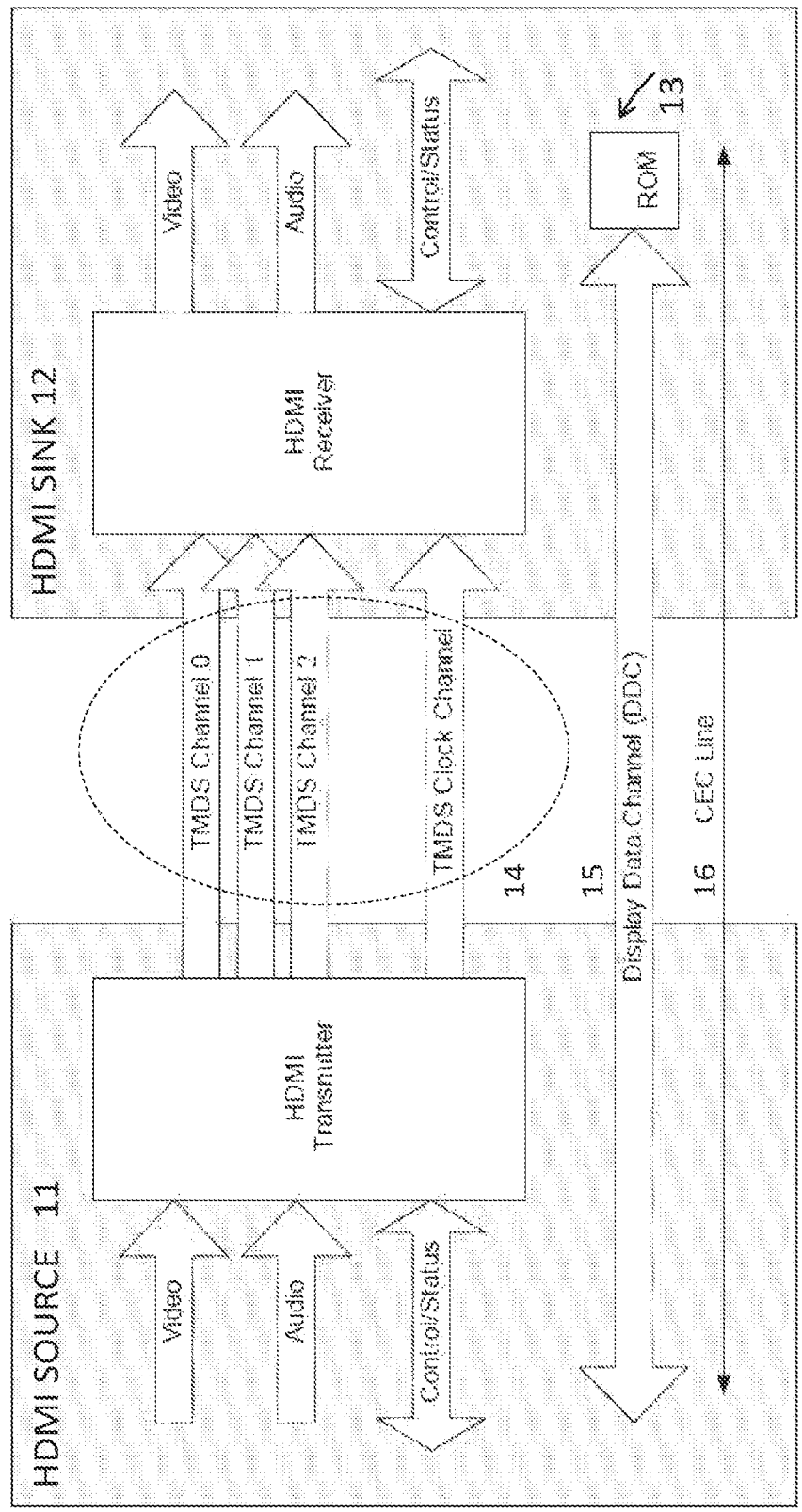
FIG. 1 is a block diagram detailing the wired communication between an HDMI source and an HDMI sink from the HDMI specification, as detailed in the prior art.
Figure 4B:
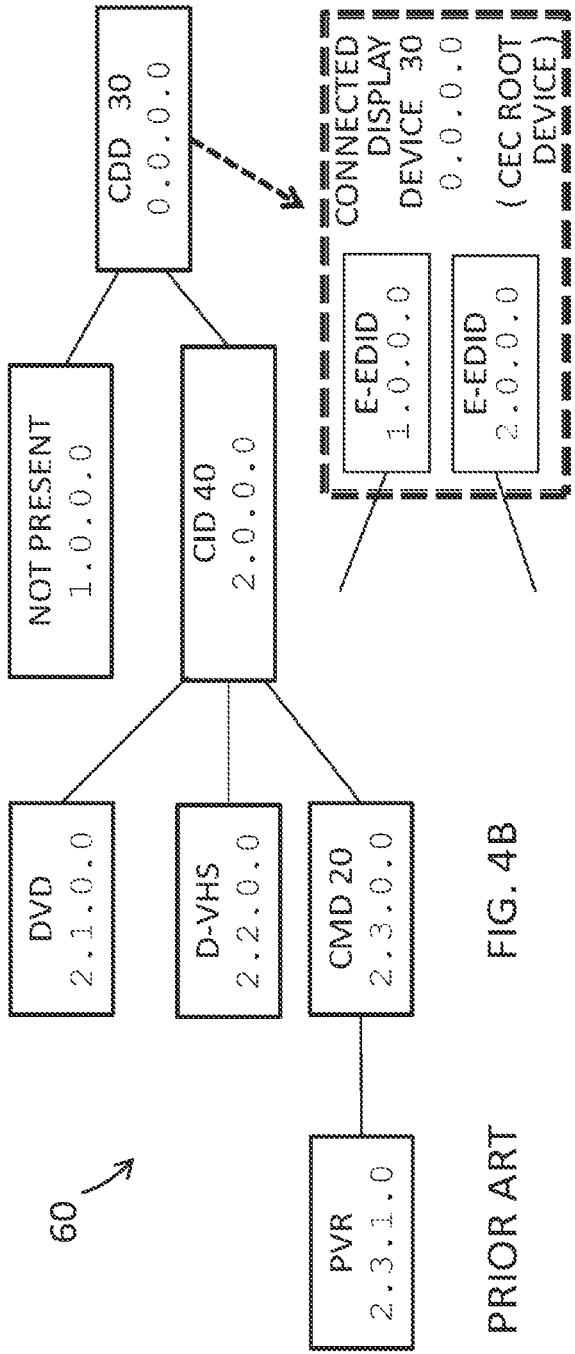
FIG. 4B is an adapted block representation of a cluster with physical addresses from the HDMI specification, as detailed in the prior art.

In the following detailed description, reference is made to the accompanying drawings, which form a part hereof. The illustrative embodiments described in the detailed description, drawings and claims are not meant to be limiting. Other embodiments can be utilized, and other changes can be made, without departing from the spirit or scope of the subject matter presented herein. Unless specified otherwise, the terms "comprising," "comprise," "including" and "include" used herein, and grammatical variants thereof, are intended to represent "open" or "inclusive" language such that they include recited elements but also permit inclusion of additional, un-recited elements.

As used herein, the term "controller device" can be effectuated with: (i) a conventional remote control device; (ii) a universal remote control device; and (iii) a computing device with a native or downloaded remote control software application. The computing device may be a laptop, a desktop computer, a notepad, a smart phone, a game controller, or a table top device. Example table top devices include the virtual assistant products sold under the brand names of Amazon Alexa, Amazon Echo, Echo Dot, Echo Studio. and Amazon Tap. Each controller device is programmable, in that it can select and/or receive specific function codes. The controller devices can transmit function codes to a connected display device (CDD) via a wireless transmission protocol, such as by radio frequency transmission (e.g., BLE, Wi-Fi, or other RF transmission protocols) and/or infrared transmission protocol.

As used herein, a "user input" may be implemented by a display, a keyboard, a mouse, a touch screen, a touch pad, a voice recognition function, and/or similarly directed means for receiving instruction from a user. On a conventional remote control or universal remote control, the user display would most likely be the physical keys of the device. On computing devices, the user display could be a capacitive touch screen and/or a voice recognition function.

As used herein, the software and hardware of a "server" may be implemented within a single stand-alone computer, a stand-alone server, multiple dedicated servers, and/or a virtual server running on a larger network of servers and/or a cloud-based service.

As used herein, a "database" may store data to and access data from a controller device (CD) memory of small storage capacity, a single stand-alone computer, a laptop, a tablet, a data server, multiple dedicated data servers, a cloud-based service, and/or a virtual server running on a network of servers. As discussed in the description, the use of the term "database" indicates a collection of tables, records, and/or linkage information for the data records. As depicted in the description and figures, each database can be maintained separately and/or maintained collectively in a single database or through linkages to other database. The databases depicted in the description and figures can be on the same server or on separate servers. Data links between tables can be links in one database or links between separate databases.

FIGS. 1, 2, 3A. 3B, 4A, 4B, and 5 represent the prior art and have been described in the background section of this Application.

For convenience, the below table identifies the reference item numbers employed in the figures of the Application.
No. Description
- 11 HDMI source
- 12 HDMI sink
- 13 ROM
- 14 TMDS channels
- 15 display data channel (DDC)
- 16 CEC line
- 20 content management device (CMD)
- 21A CMD audio/visual input
- 21B coaxial cable
- 21C coaxial cable output
- 22 ethernet input
- 23A CMD audio/visual output
- 23B CDD audio/visual input
- 23C HDMI cable
- 23C-1 first HDMI cable
- 23C-2 second HDMI cable
- 24A CMD radio frequency (RF) transceiver
- 24B CDD radio frequency (RF) transceiver
- 24C CD radio frequency (RF) transceiver
- 25A CMD infrared receiver
- 25B CDD infrared receiver
- 25C CD infrared transmitter
- 26A power input
- 26B power cable
- 26C power output
- 27A discovery module
- 27B inspection module
- 27C CD programmer
- 27D update module
- 27E codeset database
- 27F sink database
- 30 connected display device (CDD)
- 40 connected intermediary device (CID)
- 41A CID audio/visual output
- 41B CID audio/visual input
- 50 controller device (CD)
- 51 CD memory
- 52 codeset test module
- 60 cluster FIG. 6 is a block diagram illustrating the HDMI connections between a content management device 20 and a connected display device 30 via a connected intermediary device 40, in an embodiment of the invention. FIG. 6 is dissimilar to the block diagram of FIG. 5 in that it includes a connected intermediary device 40 located between the content management device 20 and the connected display device 30. First audio/visual content is received by the content management device 20, the second audio/visual content is transmitted from the content management device 20 to the connected intermediary device 40 via a first HDMI cable 23C-1 via the HDMI communication protocol, and the third audio/visual content is transmitted from the connected intermediary device 40 to the connected display device 30 via a second HDMI cable 23C-2 via the HDMI communication protocol.

The first audio/visual content can include one or multiple channels of content. The content management device 20 can select a single channel of content for delivery to the connected intermediary device 40 in the second audio/visual content. E.g., the second audio/visual content is likely to be a subset and/or specifically formatted version of the first audio/visual content. The second audio/visual content and the third audio-visual content can be identical are substantially similar. E.g., the connected intermediary device 40 can act as a repeater and forward audio/visual content unaltered.

Figure 5:
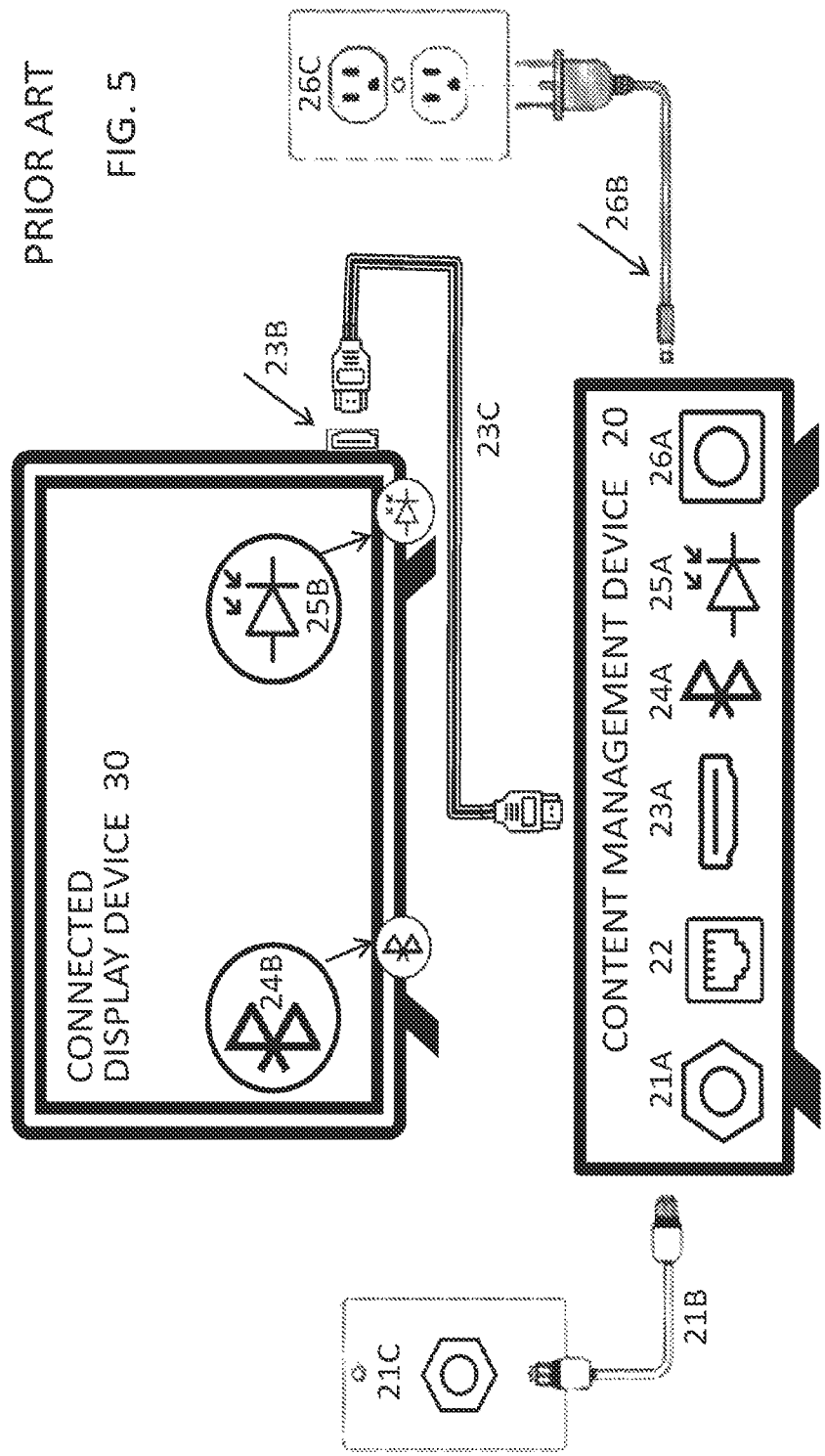
FIG. 5 is a block diagram illustrating the HDMI connection between a content management device and a connected display device, as known in the prior art.
Figure 6:
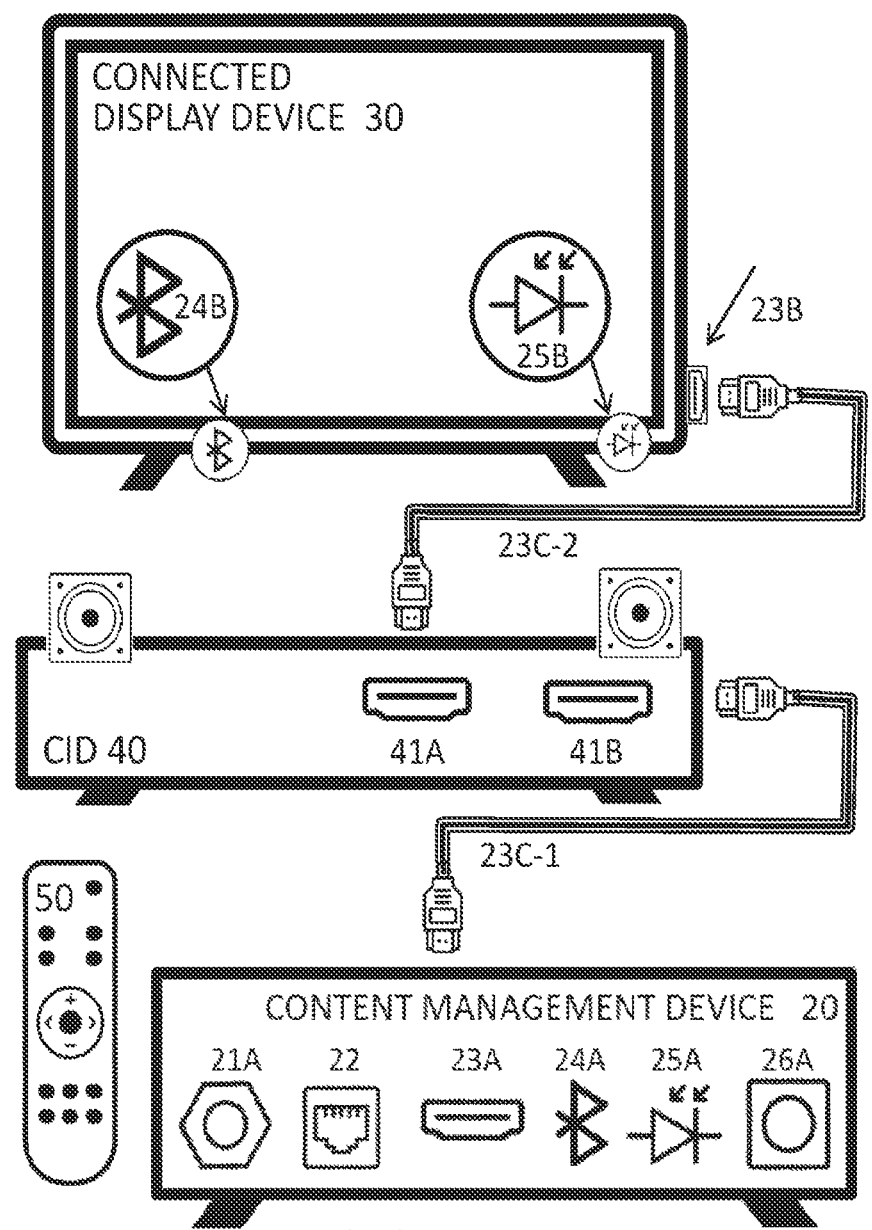
FIG. 6 is a block diagram illustrating the HDMI connections between a content management device and a connected display device via a connected intermediary device, in an embodiment of the invention.

As in FIG. 5, the content management device 20 of FIG. 6 includes a CMD audio/visual input 21A (depicted as a coaxial input 21A in FIG. 5), an ethernet input 22, a CMD radio frequency (RF) transceiver 24A, a CMD infrared receiver 25A, and a power input 26A. As in FIG. 5, the connected display device 30 includes a CDD RF transceiver 24B and a CDD infrared receiver 25B. While not illustrated in FIGS. 5 and 6, the content management device 20 could also include a Wi-Fi transceiver for receiving the audio/visual content, rather than the coaxial cable 21B, or alternatively receive the audio/visual content via the ethernet input 22.

The CMD RF transceivers 24A and CDD RF transceivers 24B in FIGS. 5 and 6 are illustrated as Bluetooth Low Energy (BLE) transceivers, but could be any type of radio frequency (RF) transceiver. E.g., a BLE transceiver is a type of RF transceiver. Bluetooth is a registered trademark of The Bluetooth Special Interest Group (SIG).

Infrared communication protocols require line of sight and are most usually uni-directional. As such an CD infrared transmitter 25C on a controller device 50 can transmit function codes from the controller device 50 to a CDD infrared receiver 25B of a connected display device 30 (such as a television) or a CMD infrared receiver 25A of a content management device 20 (such as a set top box). Common modulation techniques for infrared transmitters include pulse distance coding and Manchester coding. The infrared communication protocol is transmitted by the infrared transmitter and received by the infrared receiver.

To assist updating of a controller device's 50 programming, radio frequency transmission can be employed, even if the function codes are later transmitted to the connected display device 30 via an infrared communication protocol by an CD infrared transmitter 25C and received by a CDD infrared receiver 25B. A controller device (CD) radio frequency (RF) transceiver 24C provides both a higher data bandwidth and bilateral communication. BLE transceivers are one type of RF wireless transceivers. BLE has the benefit of a published standardized protocol, enabling different companies to align the communication protocols between various controller devices 50, set top boxes, and televisions. The BLE protocol, however, includes a wider set of instructions and hence a larger firmware and memory overhead to support its usage. RF transceivers operating under a reduced, simplified instruction set can reduce the complexity, energy usage, and cost of a controller device 50.

Note that while FIG. 6 illustrates a system with a single connected intermediary device 40, the invention is not limited to use with just one connected intermediary device 40. As an example, the system could comprise a hierarchy of two or more connected intermediary devices 40 connected in series between the content management device 20 and the connected display device 30.

Figure 7:
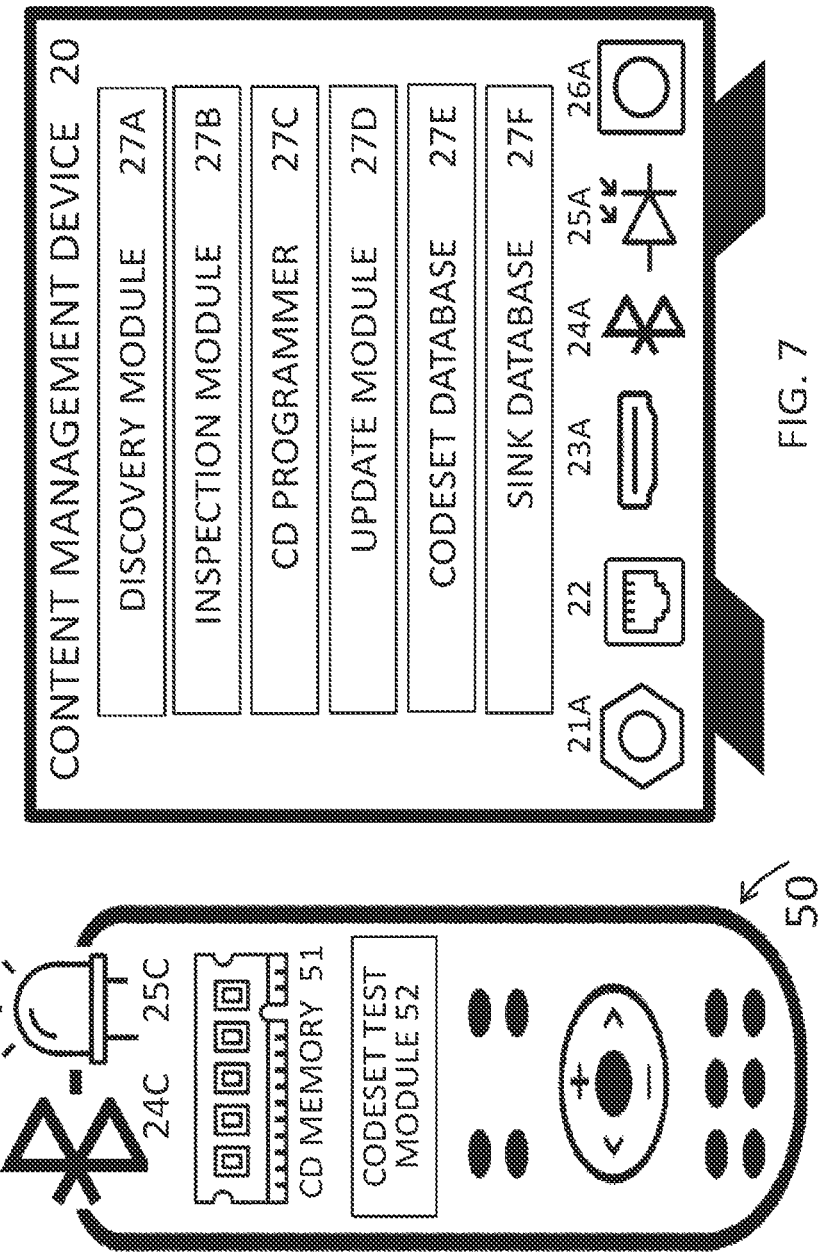
FIG. 7 is a block diagram illustrating a controller device paired with a content management device, in an embodiment of the invention.

FIG. 7 is a block diagram illustrating a controller device 50 paired with a content management device 20, in an embodiment of the invention. The controller device 50 includes an CD radio frequency (RF) transceiver 24C, an CD infrared transmitter 25C, an CD memory 51, and a codeset test module 52. As in FIGS. 5 and 6, the content management device 20 includes a CMD audio/visual input 21A (depicted as a coaxial input 21A in FIG. 5), an ethernet input 22, a CMD radio frequency (RF) transceiver 24A, a CMD infrared receiver 25A, and a power input 26A. As illustrated in FIG. 7, the content management device 20 further includes a discovery module 27A, an inspection module 27B, an CD programmer 27C, an update module 27D, a codeset database 27E, and a sink database 27F.

A general embodiment of the invention is a controller device programming system and method directed at identifying a connected display device 30 connected to a content management device 20 via at least one connected intermediary device 40. The system and method evaluate the details included within a sink data amalgamation that includes sink identification data from both the connected display device 30 and at least one of the connected intermediary devices 40. Keywords, whitelists, and blacklists can be employed to evaluate the content of the sink data amalgamation and determine one or more priority display device matches to, in turn, improve selection of a set of function codes for control of the connected display device 30 using a controller device 50 paired with the content management device 20.

A primary embodiment of the invention is a controller device programming system for performing at least one programming request for a controller device (CD) 50, the controller device 50 paired with a content management device (CMD) 20 in indirect data communication with a connected display device (CDD) 30 via at least one connected intermediary device (CID) 40. The controller device 50 includes: (i) an CD radio frequency (RF) transceiver; (ii) an CD memory; and (iii) a codeset test module 52. The content management device 20 includes: (1) a CMD audio/visual input 21A configured to receive first audio/visual content according to a first communication protocol; (2) a CMD audio/visual output 23A configured to send second audio/visual content directly or indirectly to the at least one connected intermediary device 40 according to a second communication protocol; (3) a CMD RF transceiver 24A configured for wireless communication with the controller device 50 according to a third communication protocol; and (4) a discovery module 27A, an inspection module 27B, and an CD programmer 27C. The content management device 20 stores or links to: (1) a codeset database 27E with a plurality of codeset records; and (2) a sink database 27F with a plurality of sink records. Each codeset record includes or links to: (i) at least one codeset identifier of a plurality of codeset identifiers; and (ii) a set of function codes associated with the at least one codeset identifier of the codeset record. Each sink record includes or links to: (i) at least one sink identifier of a plurality of sink identifiers, each sink identifier associated with at least one of a plurality of sink devices; (ii) at least one of the codeset identifiers, the at least one codeset identifier designating the set of function codes for the at least one sink device associated with the sink record; and (iii) a keyword set for the at least one sink device associated with the sink record. The keyword set of each sink record includes at least one of: (1) manufacturer name of the at least one sink device associated with the sink record; (2) device name of the at least one sink device associated with the sink record; and (3) serial number of the at least one sink device associated with the sink record. Each of the at least one connected intermediary devices 40 includes: (i) a CID audio/visual input 41B configured to receive the second audio/visual content directly or indirectly from the content management device 20 according to the second communication protocol; and (ii) a CID audio/visual output 41A configured to send third audio/visual content from the connected intermediary device 40 directly or indirectly to the connected display device 30 according to the second communication protocol. The connected display device 30 includes: (i) a CDD audio/visual input 23B configured to receive the third audio/visual content from the content management device 20 according to the second communication protocol; and (ii) at least one of a CDD RF transceiver 24B and a CDD infrared receiver 25B.

As used in this specification, the term "device name" is intended to include any of the following: (i) the display product name of a device, as identified under the VESA E-EDID standard; (ii) a model name as included within the display product name of a device VESA E-EDID standard; and (iii) a name of common usage given to a device by the marketer or manufacturer of a device. The terms "device" and "device name" are not limited to display products. E.g., devices can include products other than connected display devices.

In the primary embodiment of the invention, for each programming request, the discovery module 27A of the content management device 20 is configured to: (1) receive physical address data for a cluster 60 including the connected display device 30, the at least one connected intermediary device 40, and the content management device 20; (2) confirm presence of indirect data communication between the content management device 20 and the connected display device 30 based on the physical address data; and (3) request and receive sink identification data via the second communication protocol. For each programming request, the sink identification data: (1) is organized according to a device identification data structure; and (2) comprises a sink data amalgamation. The sink data amalgamation comprises at least two of: (a) the manufacturer name of at least one of the connected intermediary devices 40; (b) the manufacturer name of the connected display device 30; (c) the device name of at least one of the connected intermediary devices 40; (d) the device name of the connected display device 30; (e) the serial number of at least one of the connected intermediary devices 40; and (f) the serial number of the connected display device 30. For each programming request, the inspection module 27B of the content management device 20 is configured to: (i) access the sink identification data received by the discovery module 27A; (ii) access the sink records of the sink database 27F; (iii) perform a keyword search of the keyword sets of the sink records of the sink database 27F employing at least a portion of the sink identification data; (iv) identify at least one priority display device match: and (v) cross-reference each priority display device match to at least one codeset identifier in the sink records of the sink database 27F. A priority of each priority display device match is calculated according to at least one of: (1) a first reliability score for the manufacturer name; (2) a second reliability score for the device name; and (3) a third reliability score for the serial number. For each programming request, the CD programmer 27C is configured to: (i) access the codeset database 27E; (ii) initialize communication with the controller device 50 via the third communication protocol; and (iii) for each codeset identifier cross-referenced to at least one priority display device match by the inspection module 27B, transfer at least a portion of the set of function codes associated with the codeset identifier to the controller device 50 via the third communication protocol. For each programming request, the controller device 50 is configured to: (i) test functionality of at least a subset of each set of function codes received by the controller device 50 from the CD programmer 27C of the content management device 20 to identify at least one functional codeset; (ii) store at least one functional codeset within the CD memory 51 of the controller device 50; and (iii) employ the at least one functional codeset, based on user input, to control operation of the connected display device 30.

In an alternative embodiment of the invention, the sink records of the sink database 27F are categorized into at least one of: (i) a manufacturer name whitelist associated a plurality of confirmed display manufacturers; and (ii) a manufacturer name blacklist associated with at least one of a plurality of audio device manufacturers, a plurality of non-display device manufacturers, and a plurality of repeater device manufacturers. For each programming request, the inspection module 27B: (i) locates the manufacturer name identified by the sink identification data, as mapped by the device identification data structure; and (ii) searches the sink database 27F for the identified manufacturer name. For each programming request, the inspection module 27B can also optionally: (i) increase a reliability score of the manufacturer name of the programming request if the manufacturer name included in the sink identification data of the programming request is included within the manufacturer name whitelist; and (ii) decrease the reliability score of the manufacturer name of the programming request if the manufacturer name included in the sink identification data of the programming request is included within the manufacturer name blacklist.

The cause and impact of the sink data amalgamation may change over time as new HDMI devices are introduced to the market. A key initial technical problem identified during research leading to the invention included instances of sink data amalgamations that including the ID manufacturer name of an audio device (connected as the repeater) along with the display product name of a television (connected as the CEC root device). In this instance, the ID manufacturer name can typically be disregarded during the selection or prioritization of a priority display device match. Also, in this instance, the keyword sets of the sink database 27F are helpful to identify phrases or terms within a sink data amalgamation to identify a specific manufacturer and/or device name of the television.

In an alternative embodiment of the invention, the sink records of the sink database are categorized into at least one of: (i) a device name whitelist associated with a plurality of confirmed display device names; and (ii) a device name blacklist associated with at least one of a plurality of audio device names, a plurality of non-display device names, and a plurality of repeater device names. For each programming request, the inspection module 27B: (i) locates the device name identified by the sink identification data, as mapped by the device identification data structure; and (ii) searches the sink database for the identified device name. For each programming request, the inspection module 27B can also optionally: (i) if the device name of the programming request is included within the device name whitelist, increase a reliability score of the device name of the programming request; and (ii) if the device name of the programming request is included within the device name blacklist, decrease the reliability score of the device name of the programming request.

In an alternative embodiment of the invention, the device identification data structure is an enhanced extended display identification data (E-EDID) structure including: (a) a set of vendor and product identification fields; and (b) a set of display descriptor fields. The set of vendor and product identification fields include at least one of: (i) an ID manufacturer name; (ii) an ID product code; (iii) an ID serial number; (iv) a week of manufacture; and (v) a year of manufacture. The set of display descriptor fields include at least one of: (i) a display product serial number; (ii) an alphanumeric data string in ASCII format; and (iii) a display product name. In this alternative embodiment of the invention, the sink data amalgamation can include: (a) the ID manufacturer name of at least one of the connected intermediary devices 40; and (b) the display product name of the connected display device 30. In this alternative embodiment of the invention, the keyword set of each sink record: (a) can be assembled from at least one of a datasheet specification of the at least one sink device associated with the sink record and from an empirical E-EDID received via the second communication protocol from at least one sink device associated with the sink record; and (b) can include at least one of the ID manufacturer name of the at least one sink device associated with the sink record, the ID product code of the at least one sink device associated with the sink record, the ID serial number of the at least one sink device associated with the sink record, the week of manufacture of the at least one sink device associated with the sink record, the year of manufacture of the at least one sink device associated with the sink record, the display product serial number of the at least one sink device associated with the sink record, the alphanumeric data string in ASCII format of the at least one sink device associated with the sink record, and the display product name of the at least one sink device associated with the sink record. In this alternative embodiment of the invention, for the calculation of the priority of each priority display device match by the inspection module 27B: (a) the manufacturer name can be the ID manufacturer name within the sink identification data, as mapped by the E-EDID structure; (b) the device name can be the ID display product name within the sink identification data, as mapped by the E-EDID structure: and (c) the serial number can be the ID serial number within the sink identification data, as mapped by the E-EDID structure.

In an alternative embodiment of the invention, the content management device 20 further includes: (i) an ethernet connection connectable to an offsite server via a network: and (ii) an update module 27D. The offsite server includes: (i) a current sink database: and (ii) a current codeset database. The update module 27D of the content management device 20 is configured to perform at least one of: (i) downloading from the offsite server and storing within the content management device 20 at least a portion of the current sink database and at least a portion of the current codeset database; and (ii) linking to the current sink database and linking to the current codeset database.

The update module 27D provides post-sale access to sink records for new television models, updated keyword sets for existing sink records, and updated whitelists and blacklists. These updates have to potential to act as "bug fixes" for compatibility issues previously identified in the field by end customers or during ongoing qualification tests by the manufacturer of the set top box and/or controller device 50. For instance, specific patterns (e.g., specific combinations of ID manufacturers and display product names) can be catalogued, downloaded or accessible to the content management device 20, and employed in future programming requests to resolve sink data amalgamations.

In an alternative embodiment of the invention, the second communication protocol is an HDMI communication protocol.

In an alternative embodiment of the invention, the third communication protocol is one of: (a) a Bluetooth Low Energy protocol: and (ii) an RF protocol other than the Bluetooth Low Energy protocol. An example non-limiting list of RF protocols other than the Bluetooth Low Energy protocol include a Wi-Pi protocol, an RF4CE protocol, and a Matter protocol.

In an alternative embodiment of the invention, at least one of the connected intermediary devices 40 is an audio device.

In an alternative embodiment of the invention, the connected display device 30 includes the CDD RF transceiver 24B. And, based on the user input, the controller device 50 transmits at least one of the function codes of the at least one functional codeset via the third communication protocol from the CD RF transceiver 24C of the controller device 50 to the CDD RF transceiver 24B of the connected display device 30.

In an alternative embodiment of the invention, the controller device 50 further includes a CD infrared transmitter 25C and the connected display device 30 includes the CDD infrared receiver 25B. And, based on the user input, the controller device 50 transmits at least one of the function codes of the at least one functional codeset via a fourth communication protocol from the CD infrared transmitter 25C of the controller device 50 to the CDD infrared receiver 25B of the connected display device 30. Note that it is also possible for the fourth communication protocol to be one of: (a) a Bluetooth Low Energy protocol; and (ii) an RF protocol other than the Bluetooth Low Energy protocol. An example non-limiting list of RF protocols other than the Bluetooth Low Energy protocol include a Wi-Fi protocol, an RF4CE protocol, and a Matter protocol.

In an alternative embodiment of the invention, the content management device 20 is one of: (a) a set top box, wherein the CMD audio/visual input 21A is a coaxial cable input; (b) a digital media player, wherein the CMD audio/visual input 21A is at least one of a first ethernet input and a first Wi-Fi transceiver, and (c) a desktop or laptop computer, wherein the CMD audio/visual input 21A is at least one of a second ethernet input and a second Wi-Fi transceiver.

In an alternative embodiment of the invention, the at least one connected intermediary device 40 includes a hierarchy of connected intermediary devices. The hierarchy of connected intermediary devices 40 can be connected in series.

A secondary embodiment of the invention is a controller device programming method for performing at least one programming request for a controller device (CD) 50, the controller device 50 paired with a content management device (CMD) 20 in indirect data communication with a connected display device (CDD) 30 via at least one connected intermediary device (CID) 40. The controller device 50 includes: (i) an CD radio frequency (RF) transceiver; (ii) an CD memory; and (iii) a codeset test module 52. The content management device 20 includes: (1) a CMD audio/visual input 21A configured to receive first audio/visual content according to a first communication protocol; (2) a CMD audio/visual output 23A configured to send second audio/visual content directly or indirectly to the at least one connected intermediary device 40 according to a second communication protocol; (3) a CMD RF transceiver 24A configured for wireless communication with the controller device 50 according to a third communication protocol; and (4) a discovery module 27A, an inspection module 27B, and an CD programmer 27C. The content management device 20 stores or links to: (1) a codeset database 27E with a plurality of codeset records; and (2) a sink database 27F with a plurality of sink records. Each codeset record includes or links to: (i) at least one codeset identifier of a plurality of codeset identifiers; and (ii) a set of function codes associated with the at least one codeset identifier of the codeset record. Each sink record includes or links to: (i) at least one sink identifier of a plurality of sink identifiers, each sink identifier associated with at least one of a plurality of sink devices; (ii) at least one of the codeset identifier, the at least one codeset identifier designating the set of function codes for the at least one sink device associated with the sink record; and (iii) a keyword set for the at least one sink device associated with the sink record. The keyword set of each sink record includes at least one of: (1) manufacturer name of the at least one sink device associated with the sink record; (2) device name of the at least one sink device associated with the sink record; and (3) serial number of the at least one sink device associated with the sink record. Each of the at least one connected intermediary devices 40 includes: (i) a CID audio/visual input 41B configured to receive the second audio/visual content directly or indirectly from the content management device 20 according to the second communication protocol; and (ii) a CID audio/visual output 41A configured to send third audio/visual content from the connected intermediary device 40 directly or indirectly to the connected display device 30 according to the second communication protocol. The connected display device 30 includes: (i) a CDD audio/visual input 23B configured to receive the third audio/visual content from the content management device 20 according to the second communication protocol; and (ii) at least one of a CDD RF transceiver 24B and a CDD infrared receiver 25B.

In the secondary embodiment of the invention, for each programming request, the discovery module 27A of the content management device 20 performs the steps of: (1) receiving physical address data for a cluster 60 including the connected display device 30, the at least one connected intermediary device 40, and the content management device 20; (2) confirming presence of indirect data communication between the content management device 20 and the connected display device 30 based on the physical address data; and (3) requesting and receiving sink identification data via the second communication protocol. For each programming request, the sink identification data: (1) is organized according to a device identification data structure; and (2) comprises a sink data amalgamation. The sink data amalgamation comprises at least two of: (a) the manufacturer name of at least one of the connected intermediary devices 40; (b) the manufacturer name of the connected display device 30; (c) the device name of at least one of the connected intermediary devices 40; (d) the device name of the connected display device 30: (e) the serial number of at least one of the connected intermediary devices 40; and (1) the serial number of the connected display device 30. For each programming request, the inspection module 27B of the content management device 20 performs the steps of: (i) accessing the sink identification data received by the discovery module 27A; (ii) accessing the sink records of the sink database 27F; (iii) performing a keyword search of the keyword sets of the sink records of the sink database 27F employing at least a portion of the sink identification data. (iv) identifying at least one priority display device match; and (v) cross-referencing each priority display device match to at least one codeset identifier in the sink records of the sink database 27F. A priority of each priority display device match is calculated according to at least one of: (1) a first reliability score for the manufacturer name; (2) a second reliability score for the device name; and (3) a third reliability score for the serial number. For each programming request, the CD programmer 27C performs the steps of: (i) accessing the codeset database 27E: (ii) initializing communication with the controller device 50 via the third communication protocol: and (iii) for each codeset identifier cross-referenced to at least one priority display device match by the inspection module 27B, transferring at least a portion of the set of function codes associated with the codeset identifier to the controller device 50 via the third communication protocol. For each programming request, the controller device 50 performs the steps of: (i) testing functionality of at least a subset of each set of function codes received by the controller device 50 from the CD programmer 27C of the content management device 20 to identify at least one functional codeset; (i) storing at least one functional codeset within the CD memory 51 of the controller device 50; and (iii) employing the at least one functional codeset, based on user input, to control operation of the connected display device 30.

While various aspects and embodiments have been disclosed herein, it will be apparent that various other modifications and adaptations of the invention will be apparent to the person skilled in the art after reading the foregoing disclosure without departing from the spirit and scope of the invention and it is intended that all such modifications and adaptations come within the scope of the appended claims. The various aspects and embodiments disclosed herein are for purposes of illustration and are not intended to be limiting, with the true scope and spirit of the invention being indicated by the appended claims.

The invention claimed is:

1. A controller device programming system for performing at least one programming request for a controller device (CD), the controller device paired with a content management device (CMD) in indirect data communication with a connected display device (CDD) via at least one connected intermediary device (CID),
   (a) wherein the controller device includes:
      (i) an CD radio frequency (RF) transceiver;
      (ii) an CD memory; and
      (iii) a codeset test module:
   (b) wherein the content management device:
      (i) includes:
         (1) a CMD audio/visual input configured to receive first audio/visual content according to a first communication protocol;
         (2) a CMD audio/visual output configured to send second audio/visual content directly or indirectly to the at least one connected intermediary device according to a second communication protocol;
         (3) a CMD RF transceiver configured for wireless communication with the controller device according to a third communication protocol; and
         (4) a discovery module, an inspection module, and an CD programmer; and
      (ii) stores or links to:
         (1) a codeset database with a plurality of codeset records; and
         (2) a sink database with a plurality of sink records:
   (e) wherein each codeset record includes or links to:
      (i) at least one codeset identifier of a plurality of codeset identifiers; and
      (ii) a set of function codes associated with the at least one codeset identifier of the codeset record;
   (d) wherein each sink record includes or links to:
      (i) at least one sink identifier of a plurality of sink identifiers, each sink identifier associated with at least one of a plurality of sink devices;
      (ii) at least one of the codeset identifiers, the at least one codeset identifier designating the set of function codes for the at least one sink device associated with the sink record; and
      (iii) a keyword set for the at least one sink device associated with the sink record, the keyword set including at least one of:
         (1) manufacturer name of the at least one sink device associated with the sink record;
         (2) device name of the at least one sink device associated with the sink record; and
         (3) serial number of the at least one sink device associated with the sink record;
   (e) wherein each of the at least one connected intermediary devices includes:
      (i) a CID audio/visual input configured to receive the second audio/visual content directly or indirectly from the content management device according to the second communication protocol; and
      (ii) a CID audio/visual output configured to send third audio/visual content from the connected intermediary device directly or indirectly to the connected display device according to the second communication protocol;
   (f) wherein the connected display device includes:
      (i) a CDD audio/visual input configured to receive the third audio/visual content from the content management device according to the second communication protocol; and
      (ii) at least one of a CDD RF transceiver and a CDD infrared receiver;
   (g) wherein, for each programming request:
      (i) the discovery module of the content management device is configured to:
         (1) receive physical address data for a cluster including the connected display device, the at least one connected intermediary device, and the content management device;
         (2) confirm presence of indirect data communication between the content management device and the connected display device based on the physical address data; and
         (3) request and receive sink identification data via the second communication protocol; and
      (ii) the sink identification data:
         (1) is organized according to a device identification data structure; and
         (2) comprises a sink data amalgamation of at least two of:
            (a) the manufacturer name of at least one of the connected intermediary devices;
            (b) the manufacturer name of the connected display device;
            (c) the device name of at least one of the connected intermediary devices;
            (d) the device name of the connected display device;
            (e) the serial number of at least one of the connected intermediary devices; and
            (f) the serial number of the connected display device;
   (h) wherein, for each programming request, the inspection module of the content management device is configured to:
      (i) access the sink identification data received by the discovery module;
      (ii) access the sink records of the sink database;
      (iii) perform a keyword search of the keyword sets of the sink records of the sink database employing at least a portion of the sink identification data;

(iv) identify at least one priority display device match, wherein a priority of each priority display device match is calculated according to at least one of:
(1) a first reliability score for the manufacturer name;
(2) a second reliability score for the device name; and
(3) a third reliability score for the serial number; and
(v) cross-reference each priority display device match to at least one codeset identifier in the sink records of the sink database;
(i) wherein, for each programming request, the CD programmer is configured to:
(i) access the codeset database;
(ii) initialize communication with the controller device via the third communication protocol; and
(iii) for each codeset identifier cross-referenced to at least one priority display device match by the inspection module, transfer at least a portion of the set of function codes associated with the codeset identifier to the controller device via the third communication protocol; and
(j) wherein, for each programming request, the controller device is configured to:
(i) test functionality of at least a subset of each set of function codes received by the controller device from the CD programmer of the content management device to identify at least one functional codeset;
(ii) store at least one functional codeset within the CD memory of the controller device; and
(iii) employ the at least one functional codeset, based on user input, to control operation of the connected display device.

2. The system of claim 1,
(a) wherein the sink records of the sink database are categorized into at least one of:
(i) a manufacturer name whitelist associated a plurality of confirmed display manufacturers; and
(ii) a manufacturer name blacklist associated with at least one of:
(1) a plurality of audio device manufacturers;
(2) a plurality of non-display device manufacturers; and
(3) a plurality of repeater device manufacturers; and
(b) wherein, for each programming request, the inspection module:
(i) locates the manufacturer name identified by the sink identification data, as mapped by the device identification data structure; and
(ii) searches the sink database for the identified manufacturer name.

3. The system of claim 2, wherein, for each programming request, the inspection module further
(a) increases a reliability score of the manufacturer name of the programming request if the manufacturer name included in the sink identification data of the programming request is included within the manufacturer name whitelist; and
(b) decreases the reliability score of the manufacturer name of the programming request if the manufacturer name included in the sink identification data of the programming request is included within the manufacturer name blacklist.

4. The system of claim 1,
(a) wherein the sink records of the sink database are categorized into at least one of:
(i) a device name whitelist associated with a plurality of confirmed display device names; and
(ii) a device name blacklist associated with at least one of:
(1) a plurality of audio device names;
(2) a plurality of non-display device names; and
(3) a plurality of repeater device names; and
(b) wherein, for each programming request, the inspection module:
(i) locates the device name identified by the sink identification data, as mapped by the device identification data structure; and
(ii) searches the sink database for the identified device name.

5. The system of claim 4, wherein, for each programming request, the inspection module further:
(a) if the device name of the programming request is included within the device name whitelist, increases a reliability score of the device name of the programming request; and
(b) if the device name of the programming request is included within the device name blacklist, decreases the reliability score of the device name of the programming request.

6. The system of claim 1, wherein the device identification data structure is an enhanced extended display identification data (E-EDID) structure including:
(a) a set of vendor and product identification fields including at least one of:
(i) an ID manufacturer name;
(ii) an ID product code;
(iii) an ID serial number,
(iv) a week of manufacture; and
(v) a year of manufacture; and
(b) a set of display descriptor fields including at least one of:
(i) a display product serial number;
(ii) an alphanumeric data string in ASCII format; and
(iii) a display product name.

7. The system of claim 6, wherein the sink data amalgamation includes:
(a) the ID manufacturer name of at least one of the connected intermediary devices; and
(b) the display product name of the connected display device.

8. The system of claim 6, wherein the keyword set of each sink record:
(a) is assembled from at least one of:
(i) a datasheet specification of the at least one sink device associated with the sink record; and
(ii) an empirical E-EDID received via the second communication protocol from at least one sink device associated with the sink record; and
(b) includes at least one of:
(i) the ID manufacturer name of the at least one sink device associated with the sink record;
(ii) the ID product code of the at least one sink device associated with the sink record;
(iii) the ID serial number of the at least one sink device associated with the sink record;
(iv) the week of manufacture of the at least one sink device associated with the sink record;
(v) the year of manufacture of the at least one sink device associated with the sink record;
(vi) the display product serial number of the at least one sink device associated with the sink record;
(vii) the alphanumeric data string in ASCII format of the at least one sink device associated with the sink record;

(viii) the display product name of the at least one sink device associated with the sink record;
(ix) a device type of the at least one sink device associated with the sink record;
(x) a brand identifier of the at least one sink device associated with the sink record; and
(xi) a keyword of the at least one sink device associated with the sink record.

9. The system of claim 6, wherein, for the calculation of the priority of each priority display device match by the inspection module:
(a) the manufacturer name is the ID manufacturer name within the sink identification data, as mapped by the E-EDID structure;
(b) the device name is the ID display product name within the sink identification data, as mapped by the E-EDID structure;
(c) the device name is a model name included within the sink identification data, as mapped by the E-EDID structure; and
(d) the serial number is the ID serial number within the sink identification data, as mapped by the E-EDID structure.

10. The system of claim 1,
(a) wherein the content management device further includes:
(i) an ethernet connection connectable to an offsite server via a network; and
(ii) an update module;
(b) wherein the offsite server includes:
(i) a current sink database; and
(ii) a current codeset database; and
(c) wherein the update module of the content management device is configured to perform at least one of:
(i) downloading from the offsite server and storing within the content management device:
(1) at least a portion of the current sink database; and
(2) at least a portion of the current codeset database; and
(ii) linking to the current sink database and linking to the current codeset database.

11. The system of claim 1, wherein the second communication protocol is an HDMI communication protocol.

12. The system of claim 1, wherein the third communication protocol is one of:
(a) a Bluetooth Low Energy protocol; and
(b) an RF protocol other than the Bluetooth Low Energy protocol.

13. The system of claim 1, wherein at least one of the connected intermediary devices is an audio device.

14. The system of claim 1,
(a) wherein the connected display device includes the CDD RF transceiver; and
(b) wherein, based on the user input, the controller device transmits at least one of the function codes of the at least one functional codeset via the third communication protocol:
(i) from the CD RF transceiver of the controller device;
(ii) to the CDD RF transceiver of the connected display device.

15. The system of claim 1,
(a) wherein the controller device further includes a CD infrared transmitter and the connected display device includes the CDD infrared receiver; and
(b) wherein, based on the user input, the controller device transmits at least one of the function codes of the at least one functional codeset via a fourth communication protocol:
(i) from the CD infrared transmitter of the controller device;
(ii) to the CDD infrared receiver of the connected display device.

16. The system of claim 1, wherein the content management device is one of:
(a) a set top box, wherein the CMD audio/visual input is a coaxial cable input;
(b) a digital media player, wherein the CMD audio/visual input is at least one of a first ethernet input and a first Wi-Fi transceiver; and
(c) a desktop or laptop computer, wherein the CMD audio/visual input is at least one of a second ethernet input and a second Wi-Fi transceiver.

17. The system of claim 1, wherein the device name is a model name.

18. The system of claim 1, wherein the at least one connected intermediary device includes a hierarchy of connected intermediary devices.

19. A controller device programming method for performing at least one programming request for a controller device (CD), the controller device paired with a content management device (CMD) in indirect data communication with a connected display device (CDD) via at least one connected intermediary device (CID),
(a) wherein the controller device includes:
(i) an CD radio frequency (RF) transceiver,
(ii) an CD memory; and
(iii) a codeset test module;
(b) wherein the content management device:
(i) includes:
(1) a CMD audio/visual input configured to receive first audio/visual content according to a first communication protocol;
(2) a CMD audio/visual output configured to send second audio/visual content to the at least one connected intermediary device according to a second communication protocol;
(3) a CMD RF transceiver configured for wireless communication with the controller device according to a third communication protocol; and
(4) a discovery module, an inspection module, and an CD programmer; and
(ii) stores or links to:
(1) a codeset database with a plurality of codeset records; and
(2) a sink database with a plurality of sink records;
(c) wherein each codeset record includes or links to:
(i) at least one codeset identifier of a plurality of codeset identifiers; and
(ii) a set of function codes associated with the at least one codeset identifier of the codeset record;
(d) wherein each sink record includes or links to:
(i) at least one sink identifier of a plurality of sink identifiers, each sink identifier associated with at least one of a plurality of sink devices;
(ii) at least one of the codeset identifiers, the at least one codeset identifier designating the set of function codes for the at least one sink device associated with the sink record; and (iii) a keyword set for the at least one sink device associated with the sink record, the keyword set including at least one of:
  (1) manufacturer name of the at least one sink device associated with the sink record;
  (2) device name of the at least one sink device associated with the sink record; and
  (3) serial number of the at least one sink device associated with the sink record;

(e) wherein each of the at least one connected intermediary devices includes:
  (i) a CID audio/visual input configured to receive the second audio/visual content directly or indirectly from the content management device according to the second communication protocol; and
  (ii) a CID audio/visual output configured to send third audio/visual content from the connected intermediary device directly or indirectly to the connected display device according to the second communication protocol;

(f) wherein the connected display device includes:
  (i) a CDD audio/visual input configured to receive the third audio/visual content from the content management device according to the second communication protocol; and
  (ii) at least one of a CDD RF transceiver and a CDD infrared receiver;

(g) wherein, for each programming request:
  (i) the discovery module of the content management device performs the steps of:
    (1) receiving physical address data for a cluster including the connected display device, the at least one connected intermediary device, and the content management device;
    (2) confirming presence of indirect data communication between the content management device and the connected display device based on the physical address data; and
    (3) requesting and receiving sink identification data via the second communication protocol; and
  (ii) the sink identification data:
    (1) is organized according to a device identification data structure; and
    (2) comprises a sink data amalgamation of at least two of:
      (a) the manufacturer name of at least one of the connected intermediary devices;
      (b) the manufacturer name of the connected display device;
      (c) the device name of at least one of the connected intermediary devices;
      (d) the device name of the connected display device;
      (e) the serial number of at least one of the connected intermediary devices; and
      (f) the serial number of the connected display device;

(h) wherein, for each programming request, the inspection module of the content management device performs the steps of:
  (i) accessing the sink identification data received by the discovery module;
  (ii) accessing the sink records of the sink database;
  (iii) performing a keyword search of the keyword sets of the sink records of the sink database employing at least a portion of the sink identification data;
  (iv) identifying at least one priority display device match, wherein a priority of each priority display device match is calculated according to at least one of:
    (1) a first reliability score for the manufacturer name;
    (2) a second reliability score for the device name; and
    (3) a third reliability score for the serial number; and
  (v) cross-referencing each priority display device match to at least one codeset identifier in the sink records of the sink database;

(i) wherein, for each programming request, the CD programmer performs the steps of:
  (i) accessing the codeset database;
  (ii) initializing communication with the controller device via the third communication protocol; and
  (iii) for each codeset identifier cross-referenced to at least one priority display device match by the inspection module, transferring at least a portion of the set of function codes associated with the codeset identifier to the controller device via the third communication protocol; and (j) wherein, for each programming request, the controller device performs the steps of:
  (i) testing functionality of at least a subset of each set of function codes received by the controller device from the CD programmer of the content management device to identify at least one functional codeset;
  (ii) storing at least one functional codeset within the CD memory of the controller device; and
  (iii) employing the at least one functional codeset, based on user input, to control operation of the connected display device.

\* \* \* \* \*